US006641880B1

(12) United States Patent
Deyak et al.

(10) Patent No.: US 6,641,880 B1
(45) **Date of Patent: *Nov. 4, 2003**

(54) SIGNAGE HAVING FILMS TO REDUCE POWER CONSUMPTION AND IMPROVE LUMINANCE UNIFORMITY AND METHOD FOR USING SAME

(75) Inventors: Frank L. Deyak, Stillwater, MN (US); Neal T. Strand, Woodbury, MN (US); Ellen O. Aeling, St. Paul, MN (US); Andrew J. Ouderkirk, Woodbury, MN (US); Michael F. Weber, Shoreview, MN (US); David G. Freier, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 327 days.

This patent is subject to a terminal disclaimer.

(21) Appl. No.: 09/608,377

(22) Filed: Jun. 30, 2000

Related U.S. Application Data

(63) Continuation of application No. 09/070,380, filed on Apr. 30, 1998, now abandoned.

(51) Int. Cl.[7] ......................... B29D 23/00; B29D 22/00; B32B 1/08

(52) U.S. Cl. .................. 428/35.7; 428/34.1; 428/304.4; 40/564

(58) Field of Search .......................... 40/564, 541, 542, 40/559, 549, 582, 583; 428/35.7, 34.1, 304.4, 302.4, 315.5

(56) References Cited

U.S. PATENT DOCUMENTS

| | | | | |
|---|---|---|---|---|
| 4,539,256 A | | 9/1985 | Shipman | 428/315.5 |
| 4,729,068 A | | 3/1988 | Ohe | 362/31 |
| 5,141,790 A | | 8/1992 | Calhoun et al. | 428/40 |
| 5,229,207 A | | 7/1993 | Paquette et al. | 428/355 |
| 5,296,277 A | | 3/1994 | Wilson et al. | 428/40 |
| 5,362,516 A | | 11/1994 | Wilson et al. | 427/207.1 |
| 5,596,450 A | * | 1/1997 | Hannon et al. | 359/599 |
| 5,825,542 A | | 10/1998 | Cobb et al. | 359/487 |
| 5,918,396 A | | 7/1999 | Jung | 40/546 |
| 5,976,686 A | | 11/1999 | Kaytor et al. | 428/317.9 |

FOREIGN PATENT DOCUMENTS

| | | |
|---|---|---|
| EP | 0 290 266 A2 | 11/1988 |
| EP | 0 450 115 A1 | 10/1991 |
| EP | 0 697 281 A1 | 2/1996 |
| EP | 0 724 181 A2 | 7/1996 |
| EP | 0 810 086 A2 | 12/1997 |
| WO | WO 91/06880 | 5/1991 |
| WO | WO 97/18246 | 5/1997 |

* cited by examiner

*Primary Examiner*—Kenneth R. Rice
(74) *Attorney, Agent, or Firm*—James D. Christoff

(57) ABSTRACT

A lighted sign housing is provided with a diffuse reflective film that is selected based on its reflectivity and luminance uniformity in order to reduce power consumption required for a given luminance while also increasing luminance uniformity. A method of using such film is also provided.

18 Claims, 2 Drawing Sheets

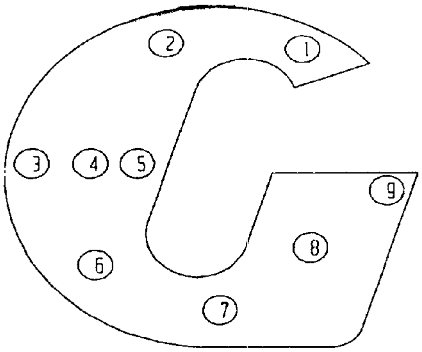
Data Point Locations FIG. 3
FIG. 1
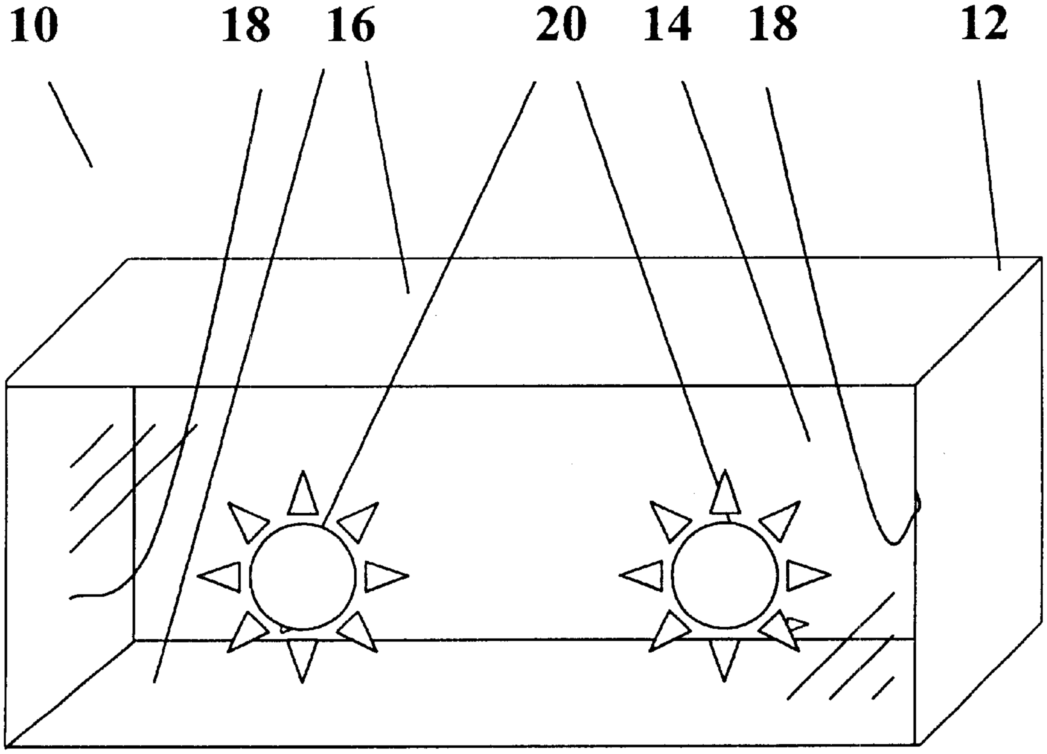

SIGNAGE HAVING FILMS TO REDUCE POWER CONSUMPTION AND IMPROVE LUMINANCE UNIFORMITY AND METHOD FOR USING SAME

This is a continuation of Application Ser. No. 09/070,380 filed Apr. 30, 1998 now abandoned.

FIELD OF INVENTION

This invention relates to film for use in the signage industry to reduce power and improve luminance uniformity.

BACKGROUND OF INVENTION

Lighted signs are everywhere in modern countries. The sign can educate, entertain, inform, or warn the viewer. The sign can be designed for close or distant viewing. Lighting is provided to assure the viewer can see the message, particularly during dimly lit days or nighttime.

Lights require energy to power them. Modern countries readily can provide the power, but those who pay for the energy are always seeking more efficient delivery of the power and more efficient usage of the power. The energy required to power a lighted sign should not be wasted for economic and environmental reasons.

Lighted signs can be "front lit" or "back lit". The former typically include such signs as billboards or other displays where the light is shone from the perimeter of the sign at an angle toward the sign. The latter typically have a translucent surface through which the light is seen and on which the message or image is placed. Uniformity of light emanating from the translucent surface is important. Often, the translucent surface includes some element that diffuses the light to reduce the identification by the viewer of the point or linear source of the light within the sign housing. Moreover, typical backlit signage today allows less than 20% of the light to escape from inside the sign for viewing. Clearly, a more efficient lighting system is needed.

The lighted sign can be in any configuration: Light sources can be neon, fluorescent, incandescent, halogen, high intensity discharge (HID), light emitting diodes (LED), or light fibers. The sign can be integral to a building, mounted as a fixture on a building, freestanding, or a part of other apparatus or equipment. The light can be powered continuously, periodically, episodically, or irregularly. Whenever the sign is lighted, the power used should not be wasted.

The lighted sign can be any geometric configuration.

Lighted signs that have a perimeter shape of a complex geometry to convey the intended message are entirely different types of signs from lighted signs that rely on a Euclidean geometry with the intended message within the perimeter. In the industry, an example of the former type of sign is called "channel letters" and can generically be called "complex shape lighted signs." The latter are called "sign cabinets" because the perimeter of the sign is irrelevant to the message being conveyed.

Nonlimiting examples of sign cabinets include rectangular, oval, circular, elliptical, and other Euclidean geometrical shapes. Nonlimiting examples of complex shape lighted signs include letters, profiles, silhouettes, characters, or any other shape desired by a customer that helps to advertise, educate, warn or the like.

Lighting of Euclidean geometric sign cabinets is more predictable than complex shape lighted signs, because even distribution of the light is quite difficult to obtain unless the light source has the substantially the same shape as the viewing area of the sign.

SUMMARY OF INVENTION

What the art of lighted signage needs is a material that can improve the efficiency of lighted signs and reduce the power consumption required to display a message in a lighted sign as well as improve the luminance uniformity of the sign. Particularly, lighted signage where the sign cabinets are a complex shape lighted sign needs significant improvement to both luminance efficiency and luminance uniformity.

One aspect of the invention is a complex shape lighted sign housing, comprising an interior surface of the complex shape lighted sign housing; and a film applied to at least a portion of complex shape of the interior surface, wherein the film provides both an increase in luminance efficiency and an increase in luminance uniformity over a sign housing of the same complex shape that does not have such film applied therein.

Preferably, the film is selected from the group consisting of a diffuse reflective film, a semi-specular reflective film, and a specular reflective film having a diffuse reflective film laminated thereto or a diffused coating coated thereto.

"Film" means a thin, flexible sheet in existence prior to contact with sign housing.

"Diffuse reflective film" means a film that is reflective without being a mirrored surface. "Reflective" is an adjective of the noun "Reflectivity" which is expressed in an industrial standard established by the American Society for the Testing of Materials (ASTM) in Standard ASTM E1164-94, the publication of which is incorporated herein by reference.

"Luminance uniformity" means the lumens of light emanating from a translucent surface are substantially uniform in a large number of locations on the surface, yielding a sign that does not significantly identify the location(s) of light source(s) within the sign housing.

A film of the present invention applied to at least a portion of an interior surface of a lighted sign housing captures the lumens of light from the light source or those lumens of light reflecting back from a diffusing panel or sides and backs of the light cabinet and re-directs such light toward the viewer and provides luminance uniformity on the translucent surface of the sign housing.

Another aspect of the present invention is a lighted sign housing, comprising an interior surface of the housing; and a film applied to at least a portion of the interior surface, wherein the film comprises a diffuse reflective film having a reflectivity of at least 80% as measured using ASTM E1164-94 and selected from the group consisting of polyolefin films filled with white particles, blends of incompatible polymers, polyolefin multilayer films; microvoided polyolefin and polyester films; fluorinated polyolefin films; vinyl chloride polymeric films filled with white particles; acrylic films filled with white particles; polyolefin films co-extruded with ethylene-vinyl acetate films; and combinations thereof.

Another aspect of the present invention is a method of using a film for signage, comprising the steps of selecting a film according to its reflectivity as measured by ASTM E1164-94 and according to its luminance uniformity; and applying the film to at least a portion of an interior surface of a lighted sign housing.

A feature of the invention is the reflectivity of the film can be controlled to provide desired power consumption reductions and improved luminance uniformity according to the needs of those skilled in the art of signage construction.

An advantage of the present invention is improvement of luminance uniformity while also providing significant power reduction for a sign, such that both utility and aesthetics of a sign are addressed by a single element within the sign housing.

Further features and advantages will become apparent as embodiments of the invention are reviewed using the following drawings.

BRIEF DESCRIPTION OF DRAWINGS

FIG. 1 is a perspective view of a sign housing.

FIG. 3 is a perspective view of a sign housing being measured for luminance and luminance uniformity in the Examples below.

EMBODIMENTS OF INVENTION

Figure 2:
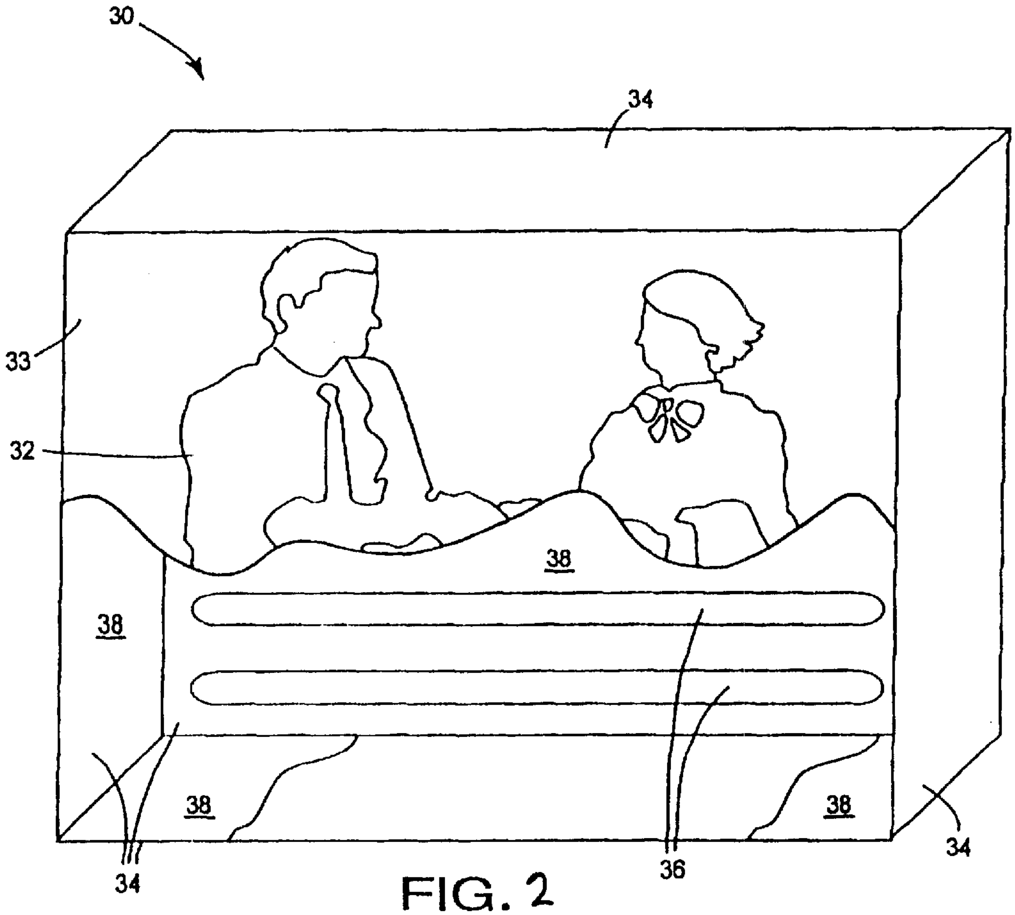
FIG. 2 is a perspective view of a sign housing using film of the present invention.

FIG. 1 shows a sign 10 comprising a housing, generally 12, having a translucent facing side 14, two horizontal interior surfaces 16, three interior vertical surfaces 18 (one back surface distal from the facing side 14 and two surfaces contiguous to the facing side 14), and light sources 20 arranged within the interior of housing 12. The film of the present invention can be applied to at least a portion of the interior of housing 12, in any amount of surface of any combination of horizontal surfaces 16 and vertical surfaces 18, and preferably applied to all areas of all surfaces 16 and 18, because the more area of interior surfaces covered, the more efficient the use of lumens of light from the light source(s).

FIG. 2 shows an example of a preferred diffuse reflective film within a sign housing. A sign cabinet 30 includes an image on film 32 (such as Panaflex™ brand Series 645 or 945 substrate from Minnesota Mining and Manufacturing Company, St. Paul, Minn. USA) attached as the front panel of a box 33 having the other sides 34 made of an inexpensive and heat resistant material such as aluminum or steel, whether mill-finished or painted. The cabinet 30 contains a light source 36 able to provide sufficient light to illuminate the imaged film over a prolonged period of time. Bright lights are commonly used because of the loss of lumens during reflection within the sign cabinet. Diffuse reflector films 38 are placed on at least one inner surface, preferably all five interior surfaces of the cabinet 30 to minimize the amount of light lost to absorption.

Film

Film can be selected from any film that has the properties of reflectivity and luminance uniformity. Desirably, the film is selected from the group consisting of a diffuse reflective film, a semi-specular reflective film, and a specular reflective film having a diffuse reflective film laminated thereto or a diffused coating coated thereto. Preferably, the film has a reflectivity of at least 80% as measured according to ASTM E1164-94 and more preferably, a reflectivity of at least 90%. It has been found in the present invention that there is a mathematical relationship between increase in reflectivity and increase in luminance. As a first approximation, for each percentage increase in reflectivity above 90%, the luminance or brightness of the sign increases 5–7%. Therefore, unlike the law of diminishing returns, every effort should be undertaken to find and use films that have increased reflectivity.

Nonlimiting examples of films with reflectivity of at least 80% include high efficiency optical devices (such as those disclosed in copending, coassigned, U.S. patent application Ser. No. 08/494366 (51474USA1A), diffusely reflecting multilayer polarizers and mirrors (such as those disclosed in copending, coassigned, U.S. patent application Ser. No. 08/927,436 microporous membranes (such as thermally induced phase separated films as disclosed in copending, coassigned, U.S. patent application Ser. No. 08/957,558 the disclosures of all applications being incorporated by reference herein; polyolefin films filled with white particles (such as Teslin™ brand film sold by PPG of Pittsburgh, Pa. USA); blends of incompatible polymers (such as Melinex™ branded polyester/polypropylene films from DuPont of Wilmington, Del., USA); microvoided polyester films; polyolefin multilayer films (such as Tyvek™ branded polyolefin films commercially available from DuPont of Wilmington, Del., USA); fluorinated polyolefin films (such as polytetrafluoroethylene); vinyl chloride polymeric films filled with white particles; acrylic films filled with white particles; and polyolefin films co-extruded with ethylene-vinyl acetate films (such as disclosed in copending, coassigned, U.S. patent application Ser. No. 08/867,891 (Emslander et al.) incorporated by reference herein); and films having a first birefringent phase and a second phase of differing index of refraction as described in U.S. patent application Ser. Nos. 08/610092, 08/807,268, and 08/807,270 and combinations thereof. All applications are incorporated herein as if fully rewritten.

Preferably, such films are the thermally induced phase separated films identified in the coassigned patent application above and generally disclosed in U.S. Pat. No. 4,539,256 (Shipman et al.), the disclosure of which is incorporated by reference herein.

Films typically have a major surface covered with adhesive. Such adhesive will generally be found on the bottom of the film (continuous or portions depending on the embodiment involved) and allows the film to be securely attached to a sign cabinets, wall, panel, table, floor, ballast, transformer,or other substrate. The type of adhesive is selected according to the signage involved, the nature of the substrate, and other factors known to those of skill in the art. For example, a pressure sensitive adhesive may be desired for some applications, and in addition to the pressure sensitive properties the ability to slide or reposition the article before the adhesive sets or cures may also be advantageous. Commercially superior pressure sensitive adhesives for sign graphics are available on image graphic webs marketed under the Scotchcal™ and Scotchcal™ Plus brands from 3M of St. Paul, Minn., USA. Pressure sensitive adhesives having this utility are disclosed in a variety of patents. Among these adhesives are those disclosed in U.S. Pat. Nos. 5,141,790 (Calhoun et al.); 5,229,207 (Paquette et al.); 5,296,277 (Wilson et al.); 5,362,516 (Wilson et al.); PCT Patent Publication WO 97/18246; and copending, coassigned U.S. patent application Ser. Nos. 08/775,844 (Sher et al.) 08/613753 and 08/606,988 the disclosures of all of which are incorporated by reference herein. A release liner may also be applied to protect the adhesive layer until needed.

Alternatively to adhesives, mechanical fasteners can be used if laminated in some known manner to that opposing major surface of the film of the present invention. Nonlimiting examples of mechanical fasteners include Scotchmate™ and Dual Lock™ fastening systems, as disclosed in PCT Patent Application Serial No. 08/930957 (Loncar), the disclosure of which are incorporated by reference herein.

With adhesive, such films have a thickness ranging from about 50 μm to about 500 μm and preferably from about 75

μm to about 375 μm. This thickness permits the adhesive-backed film to be applied to any of the interior surfaces 16 and 18 of housing 12 as seen in FIG. 1 without substantially altering the dimension inside the housing for the sign 10 to remain in compliance with electrical codes and other regulations.

Usefulness of the Invention

As seen in FIG. 2, a lighted sign cabinet 30 can display an image on film 32. It has been found that the same luminance or brightness of the sign can be achieved with a reduction in power consumption of 50% and with equal luminance uniformity by applying the diffuse reflective film to interior surfaces of the lighted sign cabinet.

This usefulness is particularly apparent in complex shape lighted sign housings that rely upon multiple runs of neon lights or light fibers to achieve brightness and uniformity. As seen in FIG. 3, a backlit channel letter in the shape of a capital "G" has a very complex shape of interior surfaces in which to engineer both luminance efficiency and luminance uniformity. Any of the films of the present invention, semi-specular, diffuse, or diffuse/specular laminates or coatings, can unexpectedly increase both luminance efficiency and luminance uniformity in complex shape lighted sign housings, making it possible for one skilled in the art to select from a variety of films for use in complex shape signage.

Improvement in luminance uniformity is easily, qualitatively, noticed in neon backlit complex shape lighted sign housings in the form of channel letters because neon lighting tubes or light fibers can be bent only so much within the letter shape of the sign. Explanation of such usefulness and other embodiments follows in the Examples.

EXAMPLES 1 AND 2 AND COMPARATIVE EXAMPLES A–D

Four lighted signs housings in the complex shape of"G" channel letters were obtained. Each was approximately 60 cm high and illuminated with neon lighting. The transformers were remote wired. Two channel letters were wired in series. Two of the channel letters were powered by a single transformer that had an output of 30 milliamps at 4,000 volts. The other two letters were powered by a single transformer with an output of 60 milliamps at 4,000 volts. In each set of two channel letters, one letter was illuminated with a single row of neon and the other with a double row of neon. Each row of neon tubing generally followed the shape of the channel letter in a parallel manner.

The luminance of each channel letter was measured with a Minolta, model LS-110 luminance meter (Minolta Camera Company, Ltd., Japan) with a ⅓ degree spot. The meter was held against the face of each channel letter. Nine positions were measured on each channel letter, as seen in FIG. 3. After four hours of lighting to stabilize light output, color, and temperature, the luminance of each channel letter was measured and recorded. Letters #1–#4 as manufactured with white painted interior surfaces became Comparative Examples A–D, with Letters #1 & #3 were lined with 300 μm thick, oil out, microporous membrane made according to U.S. Pat. No. 4,539,256 (Shipman et al.). These modified Letters #1 and #3 became Examples 1 and 2. Double coated tape was used to attach the microporous membrane to the interior surfaces of the channel letters. Microporous membrane was applied to all of the interior surfaces of the channel letter. Below is the a table of the average luminance from the nine locations, before and after the application of microporous membrane.

TABLE 1

Average Luminance

| Example | Film | Power (mAmps.) | Neon Rows | Average Luminance (Candela/m$^2$) |
|---|---|---|---|---|
| A | No | 30 | Single | 185 |
| 1 | Yes | 30 | Single | 366 |
| B | No | 30 | Double | 332 |
| C | No | 60 | Single | 383 |
| 2 | Yes | 60 | Single | 733 |
| D | No | 60 | Double | 658 |

The above table shows that use of the diffuse reflective film doubled the luminance at the same power or equaled the luminance of a sign having twice the power consumption, regardless of whether a single or double row of neon lights was employed. Thus, one skilled in the art is able to control which parameter is more important luminance or power, while achieving twice the efficiency of energy usage as revealed in luminance emanating from the sign housing.

The same Examples were tested for luminance uniformity by measuring luminance at both the brightest spot of light on the channel letter and at the dimmest light on the channel letter. A ratio of the brightest/dimmest luminance was then obtained. Table 2 shows the results.

TABLE 2

Luminance Uniformity

| Example | Film | Power (mAmps.) | Neon Rows | Luminance Uniformity Ratio |
|---|---|---|---|---|
| A | No | 30 | Single | 2.20 |
| 1 | Yes | 30 | Single | 1.65 |
| B | No | 30 | Double | 1.67 |
| C | No | 60 | Single | 1.93 |
| 2 | Yes | 60 | Single | 1.58 |
| D | No | 60 | Double | 1.40 |

As seen in Table 2, Example 1 provided substantially the same luminance uniformity ratio as Comparative Example B, even though the former had only one row of neon light. Moreover Example 2 provided substantially the same luminance uniformity ratio as Example 1 even though the former had twice as much power. Thus, one skilled in the art can control the luminance uniformity for great advantage in the aesthetic appearance of the lighted sign.

The invention is not limited to above embodiments. The claims follow.

What is claimed is:

1. A lighted sign housing comprising:

(a) a front translucent surface panel provided as a complex shape (b) interior surfaces that together with the front translucent surface panel define a sign housing;

(c) a film applied to at least a portion of the interior surface wherein the film is selected from i) a specular reflective film having a diffuse reflective film laminated or coated thereto, and ii) a diffuse reflective film; said film having a reflectivity of at least 90% as measured using ASTM E1164-94 ; and (d) a light source for providing light within the sign housing;

wherein substantially all of the front translucent surface panel is substantially uniformly illuminated when the sign is illuminated the light source, and the complex shape of the front translucent surface panel conveys an intended message.

2. The housing of claim 1, wherein the film is a diffuse reflective film having a reflectivity of at least 80% as measured using ASTM E1164-94.

3. The housing of claim 2, wherein the diffuse reflective film has a reflectivity of at least 90% as measured using ASTM E1164-94, and wherein for each percentage increase in reflectivity in the diffuse reflective film of at least 90%, there is an increase in luminance of between about 5 and 7 percent.

4. The housing of claim 2, wherein the diffuse reflective film comprises a thermally induced phase separated polymeric film.

5. The housing of claim 4, wherein the polymeric film has a layer of pressure sensitive adhesive on one major surface and wherein the thickness of the film and adhesive ranges from about 50 $\mu$m to about 500 $\mu$m.

6. The housing of claim 2, wherein the diffuse reflective film comprises a porous polyolefin film having white particles residing in the pores.

7. The housing of claim 2, wherein the diffuse reflective film comprises a blend of incompatible polymers.

8. The housing of claim 1, wherein the interior surfaces of the housing to which the film is applied comprise substantially all horizontal and vertical interior surfaces of the housing.

9. The housing of claim 1, wherein the film is a specular reflective film having a diffuse reflective film laminated or diffused reflective coating coated thereto.

10. The lighted sign housing of claim 1 wherein the complex shape is selected from the group consisting of shapes of letters, profiles, silhouettes, and characters.

11. The lighted sign housing of claim 10 wherein the sign housing forms a sign that is a channel letter.

12. A lighted sign housing comprising:

(a) a front translucent surface panel provided as a complex shape;

(b) interior surfaces that together with the front translucent surface panel define a sign housing;

(c) a film applied to at least a portion of the interior surfaces, wherein the film comprises a diffuse reflective film having a reflectivity of at least 90%as measured using ASTM E1164-94 and selected from the group consisting of polyolefin films filled with white particles, blends of incompatible polymers, polyolefin multilayer films; microvoided polyolefin and polyester films; fluorinated polyolefin films; vinyl chloride polymeric films filled with white particles; acrylic films filled with white particles; polyolefin films co-extruded with ethylene-vinyl acetate films; and combinations thereof; and (d) a light source for providing light within the sign housing;

wherein substantially all of the front translucent surface panel is substantially uniformly illuminated when the sign is illuminated by the light source, and the complex shape of the front translucent surface panel conveys an intended message.

13. The housing of claim 12, wherein the diffuse reflective film has a reflectivity of at least 90% as measured using ASTM E1164-94.

14. The housing of claim 13, wherein for each percentage increase in reflectivity in the diffuse reflective film there is an increase in luminance of between about 5 and 7 percent.

15. The housing of claim 14, wherein the polymeric film has a layer of pressure sensitive adhesive on one major surface and wherein the thickness of the film and adhesive ranges from about 50 $\mu$m to about 500 $\mu$m.

16. The housing of claim 12, wherein the interior surfaces of the housing to which the film is applied comprise substantially all horizontal and vertical interior surfaces of the housing.

17. A method of using a film for signage, comprising the steps of:

(a) providing a sign housing having i) a front translucent surface panel provided as a complex shape ii) interior surfaces that together with the front translucent surface panel define a sign housing and iii) a light source for providing light within the sign housing; and (b) applying a film to at least a portion of the interior surfaces wherein the film is selected from i) a specular reflective film having a diffuse reflective film laminated or coated thereto, and ii) a diffuse reflective film said film having a reflectivity of at least 90% as measured using ASTM E1164-94;

wherein substantially all of the front translucent surface panel is substantially uniformly illuminated when the sign is illuminated by the light source, and the complex shape of the front translucent surface panel conveys an intended message.

18. The method of claim 17, wherein the step of applying comprises adhering the film to at least a portion of the interior surface.

* * * * *

UNITED STATES PATENT AND TRADEMARK OFFICE

CERTIFICATE OF CORRECTION

PATENT NO. : 6,641,880 B1
DATED : November 4, 2003
INVENTOR(S) : Deyak Frank L.

It is certified that error appears in the above-identified patent and that said Letters Patent is hereby corrected as shown below:

Column 6,
Line 56, after “shape” insert -- ; --.
Line 60, delete “surface” and insert in place thereof -- surfaces, --.

Column 7,
Line 3, after “illuminated” insert -- by --.
Line 47, delete “90%as” and insert in place thereof -- 90% as --.

Column 8,
Lines 18 and 39, after “film” insert -- , --.

Signed and Sealed this

Twenty-second Day of June, 2004

JON W. DUDAS
*Acting Director of the United States Patent and Trademark Office*